Patented Oct. 1, 1929

1,729,938

UNITED STATES PATENT OFFICE

BENJAMIN R. HARRIS, OF CHICAGO, ILLINOIS

LEATHER-DYE PREPARATION

No Drawing.   Application filed October 4, 1926.   Serial No. 139,560.

My invention relates to leather dye preparations and has to do more particularly with such preparations as are adaptable for dyeing leather shoes, although of course not limited thereto. An object of my invention is to produce a new and improved dye product and process for producing the same, having certain features and advantages hereinafter more fully pointed out.

My product is especially applicable to the manufacture of leather dye solutions useful in dyeing old shoes black. In prior products, the black coloring matter used, such as spirit-soluble Nigrosine was usually dissolved in alcohol (by alcohol I mean either ethyl or methyl alcohol, or a mixture of the two, which is usually used for this purpose, or ethyl alcohol denatured with suitable denaturants or some other volatile solvent) and nitrobenzene or aniline or a mixture of the two products are added with the object of making the dye penetrate the leather. It has been found that the nitrobenzene and aniline are very poisonous, and when applied as solvents and carriers of coloring matter to be used in dyeing shoes they penetrate through the leather, reach the skin and produce undesirable physiological effects on the persons wearing the shoes.

One of the features of my invention is the provision of a process of aiding the solution of the dye in alcohol and also of having a carrier which will penetrate the leather and carry with it the coloring matter, without producing objectionable physiological effects upon the wearer of the shoes. I have discovered that aromatic compounds having at least one OH group attached to the carbon of the aromatic ring are easily absorbed by leather, are miscible with alcoholic solutions of the dye and also in themselves dissolve the dye. In carrying out my invention I can use a phenolic compound in relatively small proportions which aids the solution of the dye in alcohol and which helps to carry the dye into the leather. The phenol compounds in the quantities used are much less toxic than the aniline or nitrobenzene, in fact their toxicity is of a negligible magnitude. I prefer to use phenol compounds with very low toxicity and I have found that cresols or xylenols and their derivatives, which are miscible with alcohol, are adaptable for this purpose. I have found that a mixture of the cresols, so-called tricresol, is a good solvent for the black coloring matter, Nigrosine, and the cresol dye mixture is readily absorbed by the leather. Nigrosine is a well known black dye used for dying leather. The color index number of the spirit soluble dye is 864 (Schultz & Julius No. 698). Although cresols boil at relatively high temperatures and have low vapor pressures at room temperature, when applied in my combination to the surface of leather, the surface becomes practically dry within a few seconds. This is brought about by the cresols being absorbed by the leather tissue, carrying the dye with them. This is a very important property in that it is necessary to have a liquid vehicle for the dye which will not evaporate at low temperatures and at the same time will readily and quickly produce a dry surface on the leather. In my case the cresol penetrates the leather tissue producing the desirable dry surface.

One form of carrying out my invention is to take a suitable quantity of Nigrosine and macerate it with a mixture of ethyl alcohol and cresol or a mixture of methyl and ethyl alcohol with the cresol. The dye dissolves in the solvents. The dye preparation may be applied to the surface of the leather with a dauber or brush, the alcohol evaporates and the cresol and dye penetrate the leather giving the surface a black dry appearance. One or more applications of the preparation may be made, depending upon the condition of the leather which is being dyed. The dyed leather may then be polished to give a desired gloss.

Although I prefer to use the dye as a solution, I also contemplate using it in paste form where desired.

An advantage of my invention is that the dye preparation made by my process can be applied directly to a leather with a highly glazed finish. With the old products it is usually necessary to remove the gloss with a weak ammonia or benzene solution. In such cases the properties of the leather are altered. In my case, it is unnecessary to remove the gloss of the leather but the dye may be applied directly. The cresols help the dye to penetrate the glazed surface.

The following is an illustration of one form of carrying out my invention. I take substantially eight parts of spirit soluble Nigrosine and macerate it with eighty parts of ethyl alcohol and twenty parts of cresol until the dye goes into solution. It is possible to carry out this invention by adding the cresol to the alcohol and dissolving the dye in the resultant mixture or treating the dye first with cresol and adding the alcohol subsequently. In place of ethyl alcohol a mixture of ethyl alcohol denatured with other suitable non-toxic substances may be used. I do not restrict myself to the use of alcohol as the principal ingredient in the solvent. Other liquids, acetone, for example, may be used in place of alcohol.

Generally stated, my invention consists in the addition of substances which will aid the solubility of the dye so that a larger percentage of the dye may be dissolved in a given volume of solvent and also in having a substance which will help the dye to penetrate the leather without producing undesirable physiological effects upon the person wearing the shoe. I do not limit myself to the specific amount of cresol used, nor do I limit myself as to the particular amount of dye given in the above example. Any amount of dye so long as it is below the amount that will cause "bronzing" may be used and the amount of cresol sufficient to effect the solution of the dye and aid its penetration into the leather. Nor do I limit my invention to cresol itself, but I aim to cover all suitable aromatic compounds having at least one OH group attached to the carbon of the aromatic ring and derivatives thereof. Also I contemplate employing solutions of color other than black made with dyes other than Nigrosine.

What I claim as new and desire to secure by United States Letters Patent is:—

1. A process of making a leather dye preparation including dissolving dye matter in a mixture of alcohol with an aromatic compound having at least one OH group attached to the carbon of the aromatic ring such that the resulting mixture is capable of penetrating the leather.

2. A process of making a leather dye preparation including dissolving dye matter in a mixture of alcohol and cresol.

3. The process of making a leather dye preparation including dissolving dye matter in a mixture of an aromatic compound having at least one OH group attached to the carbon of the aromatic ring, and an additional solvent, the latter being of such a nature that it is not in itself capable of carrying the dye into the leather.

4. A new composition of matter for dyeing leather including dye matter dissolved in alcohol and an aromatic compound having at least one OH group attached to the carbon of the aromatic ring capable of carrying the dye into the leather.

5. A composition used in dyeing leather including dye matter brought in solution by means of alcohol and cresol.

6. A composition of matter for dyeing leather including proportionately eight parts of Nigrosine, eighty parts of alcohol and twenty parts of cresol.

7. A composition of matter usable for dyeing leather including a suitable dye brought into solution with an aromatic compound having at least one OH group attached to the carbon of the aromatic ring capable of carrying the dye into the leather to suitably dye the same and another solvent not in itself capable of sufficiently carrying the dye into the leather to suitably dye the same.

In witness whereof, I hereunto subscribe my name this 27th day of September, 1926.

BENJAMIN R. HARRIS.